US005490029A

United States Patent [19]
Madsen et al.

[11] Patent Number: 5,490,029
[45] Date of Patent: Feb. 6, 1996

[54] COMPLIANT TAPE GUIDE FOR DATA CARTRIDGES

[75] Inventors: David D. Madsen, Lakeland; Christopher J. Zwettler, Maplewood; Anthony B. Ferguson, Lake Elmo, all of Minn.

[73] Assignee: Minnesota Mining and Manufacturing Company, St. Paul, Minn.

[21] Appl. No.: 246,073

[22] Filed: May 19, 1994

[51] Int. Cl.$^6$ ............................. G11B 23/04; B65H 23/00
[52] U.S. Cl. .................... 360/132; 360/130.21; 242/346; 242/346.1
[58] Field of Search .......................... 360/130.2–130.22, 360/132; 242/342, 346, 346.2, 346.1

[56] References Cited

U.S. PATENT DOCUMENTS

| 3,861,619 | 1/1975 | Wolff | 242/188 |
|---|---|---|---|
| 4,221,348 | 9/1980 | Moeller | 242/192 |
| 4,466,564 | 8/1984 | Smith et al. | 226/170 |
| 4,523,727 | 6/1985 | Morioka | 242/192 |
| 4,534,523 | 8/1985 | Zarr | 242/192 |

(List continued on next page.)

FOREIGN PATENT DOCUMENTS

| 491475 | 6/1992 | European Pat. Off. | 242/346.2 |
|---|---|---|---|
| 0536912 | 4/1993 | European Pat. Off. | |
| 830554 | 5/1981 | U.S.S.R. | 360/130.21 |

OTHER PUBLICATIONS

IBM Technical Disclosure Bulletin, "Compliant Tape Guide," vol. 14, No. 2, Jul. 1971, p. 399.
IBM Technical Disclosure Bulletin, "Continuous Compliant Tape Guide," vol. 15, No. 8, Jan. 1973, p. 2502.
IBM Technical Disclosure Bulletin, "Air Supported Compliant Tape Guide," vol. 17, No. 4, Sep. 1974, p. 966.
IBM Technical Disclosure Bulletin, "Tape Guiding Analysis," vol. 24, No. 11B, Apr. 1982, p. 5776.
IBM Technical Disclosure Bulletin, "Tape Tension Control," vol. 25, No. 1, Jun. 1982, p. 444.
IBM Technical Disclosure Bulletin, "Air Bearing Tape Guide," vol. 25, No. 1, Jun. 1982, p. 447.
IBM Technical Disclosure Bulletin, "Compliant Tape Guide," vol. 25, No. 2, Jul. 1982, p. 809.
IBM Technical Disclosure Bulletin, "Web–Guiding Stress Functions," vol. 25, No. 4, Sep. 1982, p. 2069.
IBM Technical Disclosure Bulletin, "Antimodal Compliant Tape Guide," vol. 26, No. 7A, Dec. 1983, p. 3398.
IBM Technical Disclosure Bulletin, "Variable Spring–Rate Compliant Guuide," vol. 26, No. 8, Jan. 1984, p. 4267.
IBM Technical Disclosure Bulletin, "Tape Guide Design," vol. 27, No. 7B, Dec. 1984, p. 4360.
IBM Technical Disclosure Bulletin, "Compliant Guide Assembly With High Wear Resistance Contact PADS," vol. 29, No. 5, Oct. 1986, p. 2126.
IBM Technical Disclosure Bulletin, "Tape Guide Assemblies With Weighted Buttons," vol. 31, No. 3, Aug. 1988, p. 232.
IBM Technical Disclosure Bulletin, "Compliant Cleaner Blade Tape Guide," vol. 32, No. 3B, Aug. 1989, p. 175.
Topham, "Mechanical Design of a New Quarter–Inch Cartridge Tape Drive," Hewlett–Packard Journal, Aug. 1989, p. 67.
Covino, "Hard Coat Plus Solid Lube Fights Wear Problems," *Metal Progress*, Jun. 1975, pp. 69–70.
Seitzinger, "Coatings that Cut Friction," *Machine Design*, Oct. 21, 1976, pp. 114–119.

Primary Examiner—Robert S. Tupper
Assistant Examiner—Jefferson Evans
Attorney, Agent, or Firm—Gary L. Griswold; Walter N. Kirn; David B. Kagan

[57] ABSTRACT

A compliant tape guide for magnetic tape transported in a belt driven data cartridge which resiliently engages one edge of a tape and urges the tape to a position against a fixed flange. The compliant tape guide includes a spring strip having a flange end and a spring finger to load the flange end against the tape. The compliant guide reduces tape edge wear as well as providing for better tracking of the tape.

12 Claims, 6 Drawing Sheets

U.S. PATENT DOCUMENTS

| | | | |
|---|---|---|---|
| 4,561,609 | 12/1985 | Collins et al. | 242/192 |
| 4,571,789 | 2/1986 | Morioka | 24/625 |
| 4,581,189 | 4/1986 | Smith et al. | 264/131 |
| 4,594,772 | 6/1986 | Bucher | 29/603 |
| 4,607,808 | 8/1986 | Collins | 242/192 |
| 4,863,114 | 9/1989 | Moeller et al. | 242/188 |
| 5,097,374 | 3/1992 | Koizumi et al. | 360/132 |
| 5,104,058 | 4/1992 | Eggebeen | 242/199 |
| 5,173,828 | 12/1992 | Tanzer et al. | 360/130.21 |
| 5,204,796 | 4/1993 | Koizumi et al. | 360/132 |
| 5,218,501 | 6/1993 | Sellke | 360/130.21 |
| 5,251,844 | 10/1993 | Albrecht et al. | 242/179 |
| 5,289,988 | 3/1994 | Madsen | 242/192 |
| 5,294,072 | 3/1994 | East et al. | 242/199 |
| 5,316,235 | 5/1994 | East et al. | 242/346 |
| 5,358,193 | 10/1994 | Madsen et al. | 242/346 |
| 5,377,927 | 1/1995 | Erickson et al. | 242/346 |

2

COMPLIANT TAPE GUIDE FOR DATA CARTRIDGES

BACKGROUND OF THE INVENTION

This invention relates to improved tape guidance in a magnetic tape data cartridge.

Magnetic tape cartridges for tape carrying digital data on a number of tracks across the tape are well known. Tape cartridges include a cartridge shell that defines an enclosure, and a pair of tape reels supported within the enclosure. A length of magnetic tape extends along a tape path within the enclosure. Each end of the tape is wound onto one of the reels. The tape moves past suitable guides and across an opening in an edge of the cartridge into which a read/write head or transducer protrudes to tension the tape and write or read data when the cartridge is inserted into a recording/reproducing machine. The tape is driven by a belt so that the linear tape speed is controlled precisely.

In order to maintain the tape properly positioned so that each of the very narrow individual tracks of data is appropriately positioned as it crosses the read/write head, it is important that the tape be guided precisely along its path of travel. The clearance required between conventional guide flanges for accommodating the maximum allowable tape width within manufacturing tolerance is great enough so when the tape width varies to its minimum allowable tolerance tape width, the tape will be permitted to wander in direction laterally of the tape sufficiently to cause read/write problems when the data tracks are increased significantly in density using existing guides provided in magnetic tape cartridges.

A tape that is one-quarter inch wide (6.35 mm), using present guides, may have up to 32 tracks across the width of the tape. It is desirable to increase the density up to the range of 50 to 60 tracks on a one-quarter inch tape, utilizing a standard data cartridge. Tape speeds are now in the range of 0.5 meters per second to 3 meters per second.

Servo-drives are also used for positioning a tape under positive control, but such drives are expensive. The present invention aids in reducing the band width of tape control in servo-drives as well as reducing the complexity, and thus cost, of such drives.

Thus, the ongoing need to store increased quantities of data on a given quantity of magnetic tape, along with the development of recording heads which are capable of recording narrower tracks at ever smaller spacings has led to the need for more precise positioning of magnetic recording tape relative to the heads during recording and playback.

Magnetic tape cartridges of the type disclosed in for example, U.S. Pat. No. 5,104,058, provide precisely located reference surfaces in the form of flanged guide pins for positioning an edge of the tape relative to the head, at selected points along its path, and means for urging the tape into engagement with the flanges so as to position the tape, and hence the tracks of recorded data relative to the head. The function of urging the tape into engagement with the guide pin flanges results from the angle at which the flanged guide pins are inserted into the baseplate. By inserting at least one of the guide pins into the baseplate with a slight deviation from perpendicularity with the baseplate, a steering effect which urged the tape into engagement with particular flanges of the guide pins is provided to the data tracks relative to the head.

Flanged cylindrical tape guides have the additional advantage being able to be manufactured to a high degree of precision, since they can be produced on an automatic lathe, or screw machine.

Other tape guides for positioning the tape as it passes a magnetic head are also known. U.S. Pat. No. 5,251,844 discloses a compliant tape guide which provides a reference surface contacting one edge of a magnetic recording tape, and a moveable, or compliant member contacting the opposite edge of the tape, thereby urging the tape against the reference surface. Other complaint guides are disclosed in, for example, the following IBM Technical Disclosure Bulletins:

Vol. 14, No. 2, July, 1971, p. 399

Vol. 15, No. 8, January, 1973, p. 2502

Vol. 25, No. 1, June, 1982, pp. 444–446

Vol. 25, No. 1, June, 1982, pp. 447–448

Vol. 25, No. 2, July, 1982, pp. 809–810

Vol. 25, No. 4, September, 1982, p. 2069

Vol. 26, No. 7A, December, 1983, p. 3398

Vol. 27, No. 7B, December, 1984, pp. 4360–4361

Vol. 29, No. 5, October, 1986, pp. 2126–2127

Vol. 31, No. 3, August, 1988, pp. 232–233

Vol. 32, No. 3B, August, 1989, pp. 175–176

While the compliant guides disclosed in these references represent a variety of configurations for urging one edge of a travelling magnetic tape against a reference surface by applying force, through a compliant guide, against the opposite edge, they share a common feature, in that in all cases, the tape travels in an arcuate path around the guide while the guiding force is being applied.

The need to provide an arcuate path is further cited in U.S. Pat. No. 5,173,828, at column 4, lines 10–26, wherein it is explained that even though the tape is very thin, and hence not stiff in the transverse direction, it becomes relatively rigid when formed into a longitudinal arc, thus enabling the force of the compliant guide to press against the edge of the tape without buckling the tape.

A tape guide which engages the edges of the tape over a longer distance, thereby enabling a lubricating air film to form, so as to reduce frictional drag on the tape, is disclosed in EP 536 912, assigned to Minnesota Mining and Manufacturing Co. In addition, the longer engagement length serves to damp out vibrations and other transport deviations which might otherwise result from conditions upstream from the guide, such as tape reel eccentricity.

The tape guide also must be highly abrasion resistant, since magnetic recording tape is inherently abrasive. In IBM Technical Disclosure Bulletin Vol. 29, No. 5, October, 1986, wear resistant pads are used to contact the edge of the tape in a compliant guide system, thereby enabling the material for the spring portion of the compliant guide to be chosen without trading off spring properties for wear properties.

Surface coatings for imparting wear resistance to surfaces which might not otherwise resist wear are known. U.S. Pat. No. 4,594,772, for example, discloses a hard anodize coating which is resistant to wear caused by transport of magnetic tape.

In addition, dry lubricants can be incorporated into wear resistant anodized coatings for the purpose of reducing friction. Such coatings are described in the following references:

Seitzinger, R. C., "Coatings that Cut Friction," *MACHINE DESIGN*, Oct. 21, 1976, pp. 114–119.

Covino, C. P., "Hard Coat Plus Solid Lube Fights Wear Problems," *METAL PROGRESS*, June, 1975, pp. 69–70.

The present invention provides advantages of a compliant guide for one edge of a tape in a magnetic tape cartridge that is usable with existing recording/reproducing machines.

None of these references have a compliant guide used in the existing, standard belt driven tape cartridges. The addition of a compliant guide to the standard belt driven magnetic tape cartridge provides better tracking of the tape. The compliant guide applies a controlled amount of load on the tape edge without adversely disturbing the tape tension or tape slope. The tape is permitted to ride against a reference guide surface in the region where the tape is formed into a longitudinal curve.

SUMMARY OF THE INVENTION

A magnetic tape mounted in a tape cartridge is guided against at least one fixed guide flange surface with a spring loaded or compliant flange acting against an opposite edge of the tape as the tape is guided across a transducer or read/write head.

The fixed guide flange of the present invention and the compliant (resilient) flange which engages an opposite edge of the tape at suitable locations along the tape path permit variations in the tape width or position to be accommodated. The one edge of the tape is held very precisely in position as the tape moves across the face of the transducer read/write head.

The tape guides can vary in shape, and as shown in one form, a pair of posts have reference fixed base support flanges surrounding the posts where the posts attach to a base of the data cartridge. The support flanges have surfaces for supporting one edge of the tape. A compliant flange is attached to a wall of the data cartridge and provides a spring load against an opposite edge of the tape. The posts have a height from the support flanges that is less than the width of the tape so that the tape position is actively controlled by the compliant flange.

A second form of the invention includes an elongated tape guide that also has a base flange for supporting one edge of the tape adjacent the base of the data cartridge, with compliant flanges spring loading an opposite edge of the tape to urge the tape against the base flange in selected locations where the tape changes directions substantially.

The compliant flange construction also can be varied to suit existing requirements. A compliant flange that is made as a sandwich construction with a dampening material between two metal strips to reduce vibration transmission is shown. The tape engaging flange end of the compliant flange also can be shaped to reduce edge wear on the tape by providing a greater load at the edge of the tape engaging flange end closest to the transducer.

DETAILED DESCRIPTION OF THE PREFERRED EMBODIMENTS

Figure 1:
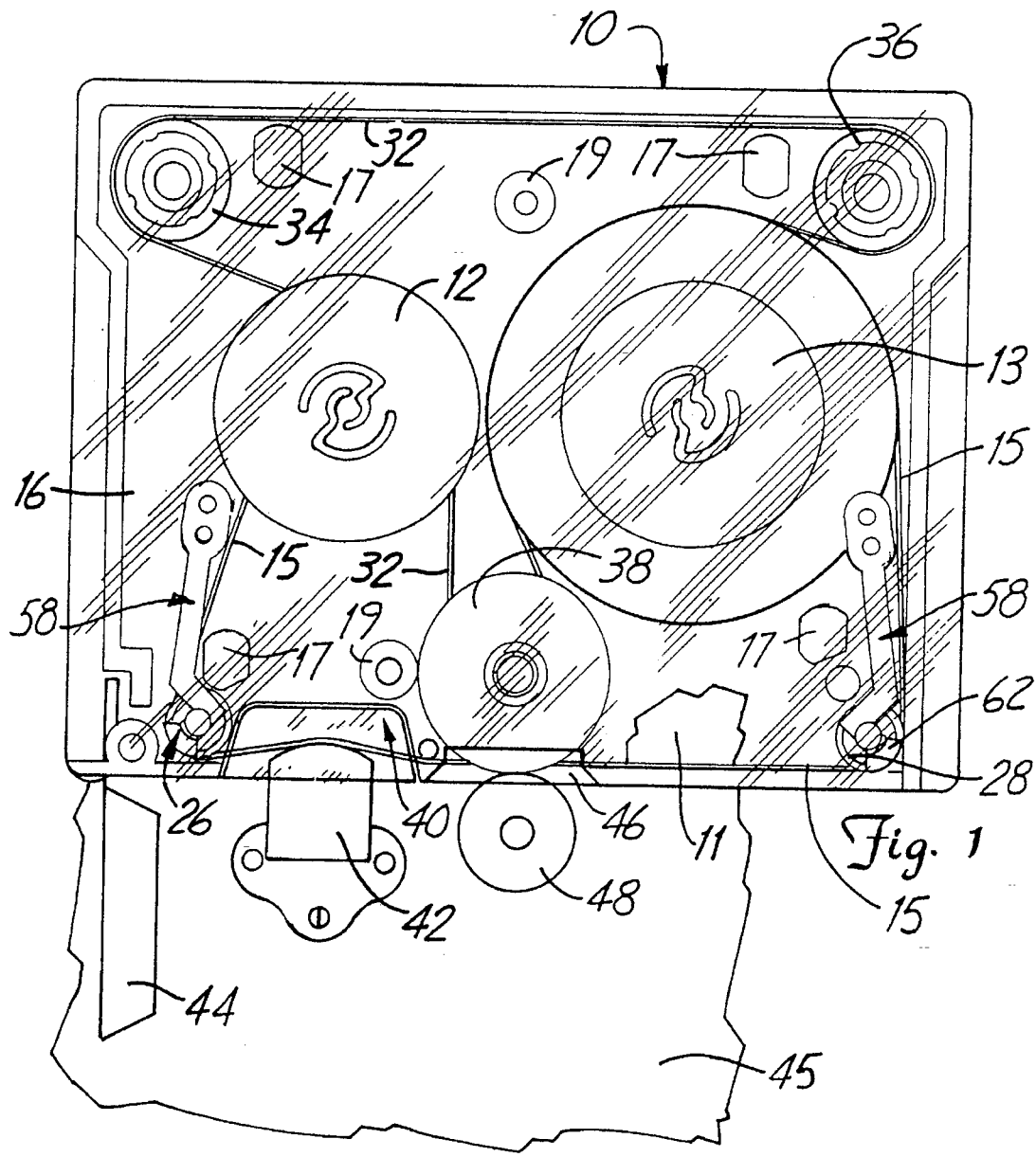
FIG. 1 is a plan view of a magnetic tape data cartridge including compliant tape guide flanges made according to the present invention.
Figure 2:
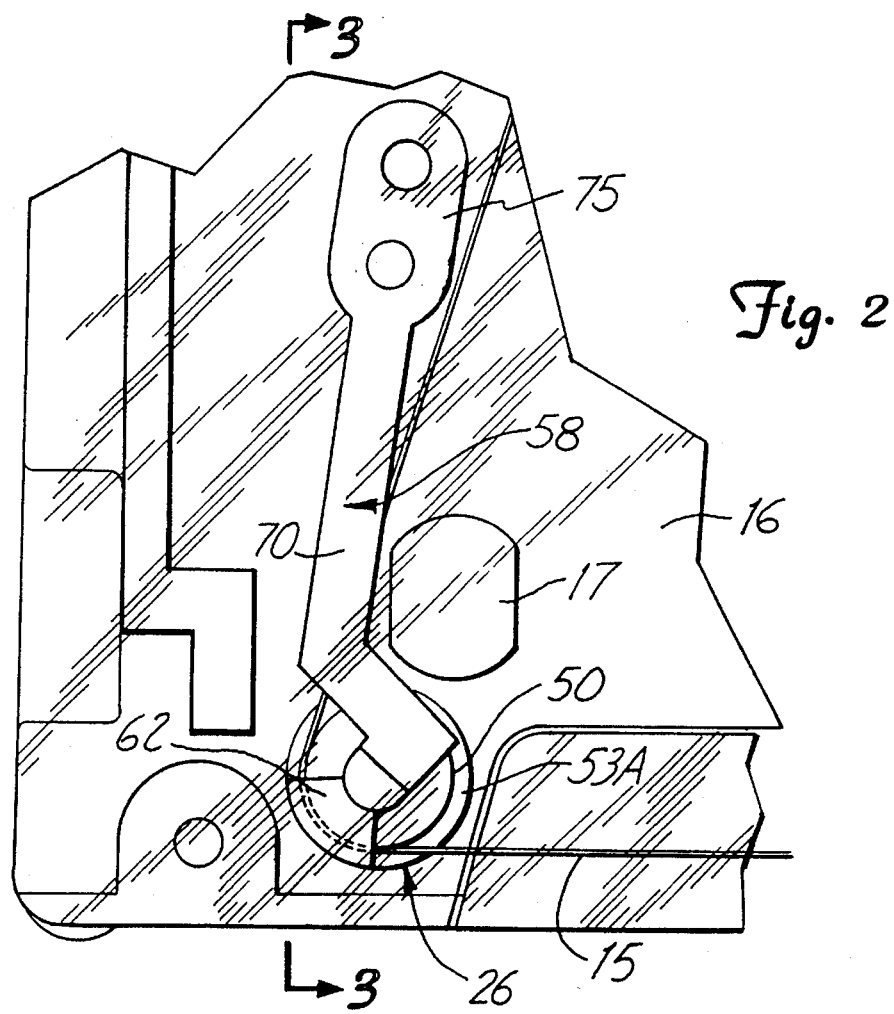
FIG. 2 is a fragmentary enlarged view of a tape guide made according to the present invention.

Referring first to FIGS. 1 and 2, a magnetic tape cartridge for carrying digital data indicated generally at 10 defines an enclosure, in which a pair of tape reels 12 and 13 are supported for free rotation about spaced, parallel axes. A length of magnetic tape 15 is moved along a tape path established by suitable guides, as will be explained. The opposite ends of the tape 15 are connected to reels 12 and 13.

Tape cartridge 10 includes a base plate 11 made of aluminum, or other suitable material, and a clear or translucent polymeric cover 16 is provided to form the tape cartridge enclosure. The cover 16 is removably fastened to the base plate 11 with conventional snap fasteners shown schematically at 17. Screw bosses 19 also are provided as needed for attachment of the cover 16 to the base plate 11.

A path for the tape 15 is defined with respect to the reels 12 and 13 by the use of suitable tape guides. Tape guide posts which form tape guides to guide the tape in the region where the tape is engaged with a transducer or read/write head are indicated generally at 26 and 28. Additional guide pins can be used if desired.

A drive belt 32 is mounted over belt guide rollers 34 and 36 and a belt drive roller 38. The belt 32 is an endless belt that contacts and drives against the outer surfaces of the tape wound on the tape spools or reels in a known manner as the belt drive roller 38 is driven. The drive belt 32 is self tensioning and maintains tension and proper speed as one reel of tape increases in size and the other reduces as described in U.S. Pat. No. 5,289,988.

The tape cartridge 10 is formed with a cut away edge portion 40 which provides access to the magnetic tape 15 by a magnetic transducer 42. The cut away portion 40 is normally closed by a spring loaded door 44, which is opened upon insertion of the tape cartridge into a tape recorder shown fragmentarily at 45. A second opening 46 is provided in the cover 16 to provide access for a belt drive capstan or puck 48. The drive puck 48 forms part of the tape recorder and is driven by a controllable and reversible motor (not shown). The magnetic transducer or read/write head 42 and the drive puck 48 are shown only illustratively since they form a part of the tape drive rather than the tape cartridge and are conventional. The drive puck 48 engages and drives against an upper drive flange on the belt drive roller 38.

The motor driving the drive puck 48 is reversible, and is capable of high speed operation. The positioning of the tape 15 is established with the tape guides 26 and 28, which in the first form of the invention comprise guide posts that are fixed to base plate 11.

Figure 3:
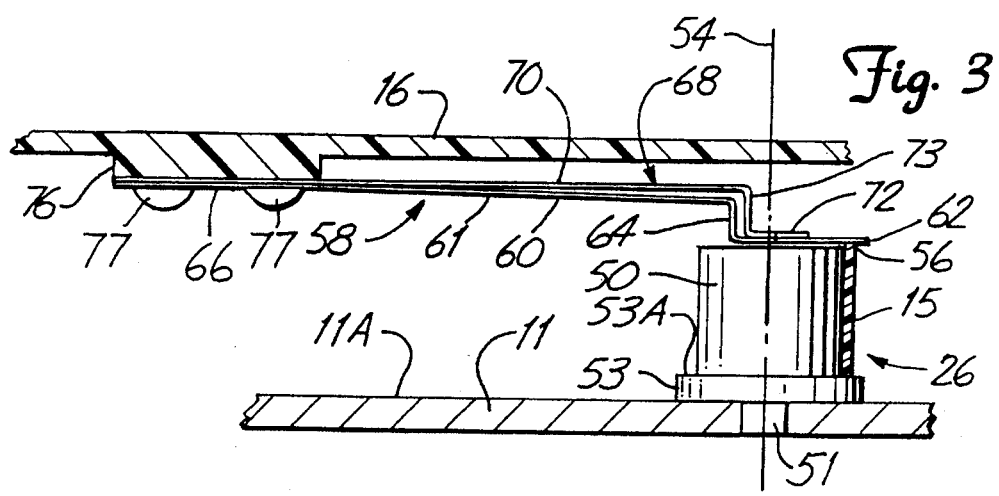
FIG. 3 is a sectional view taken as on line 3—3 in FIG. 2.

In FIG. 3 it can be seen that the base plate 11 is a relatively rigid plate, generally made of aluminum to provide support and the tape guide 26 shown includes bearing surface cylinder 50 that has a mounting shank 51 mounted in an aperture in the base plate 11 and securely held in place in the base plate 11 at the desired location. The bearing surface cylinder 50 is positioned above a reference fixed support flange or washer 53 cylinder which is seated against an upper surface 11A of the base plate 11. The reference fixed support flange 53 forms an annular flange around the base of bearing surface cylinder 50. The fixed support flange 53 preferably is a separate washer surrounding the bearing surface cylinder 50, or it can be formed integral with the bearing surface cylinder 50.

The bearing surface cylinder 50 forming part of the guide 26 is positioned in a location where the tape 15 changes direction, so that the tape is curved in a longitudinal direction around the outer surface of the bearing surface cylinder 50. The outer surface of bearing surface cylinder 50 is imperforate and the tape is in direct contact with the outer surface. The surface can be hardened or coated to reduce frictional loading of the tape. A lower or reference edge of the tape 15 slidably rides against an upper surface 53A of the reference fixed support flange 53. The upper surface 53A can be precisely maintained as to its distance from the upper surface 11A of the base plate 11. The bearing surface cylinder 50 is made to have a height along its central axis 54 that is less than the lateral width of the tape 15, so that an upper edge 56 of the tape 15 is above the upper end of the bearing surface cylinder 50.

A compliant flange assembly 58 shown in FIGS. 1, 2, 3 and 4 has a flange end that engages an upper edge 56 of the tape where the tape 15 is wrapped on the bearing surface cylinder 50. The compliant flange assembly 58 includes a resilient compliant flange base strip 60 that has a main spring section 61 and an enlarged tape engaging compliant flange end 62 that slidably engages the upper edge 56 of the tape 15. The compliant flange base strip 60 has a bend portion 64 supporting compliant flange end 62 and offsetting the compliant flange end 62 from the main spring section 61 of base strip 60. A mounting end 66 is formed on base strip 60 for supporting the base strip 60 on the data cartridge.

A spring finger 68 also forms part of the compliant flange assembly 58, and it has a main spring length 70, a mounting end 75 and a loading spring finger end 72 that is offset laterally from the spring length 70, and also is offset downwardly from the main spring length 70 with a bend portion 73. The spring finger 68 is preferably made of thicker material than the base strip 60 to provide a spring load downwardly against the compliant flange end 62. The load applied to the tape 15 by the compliant flange end 62 of the base strip 60 is controlled by the spring finger 68.

Figure 4:
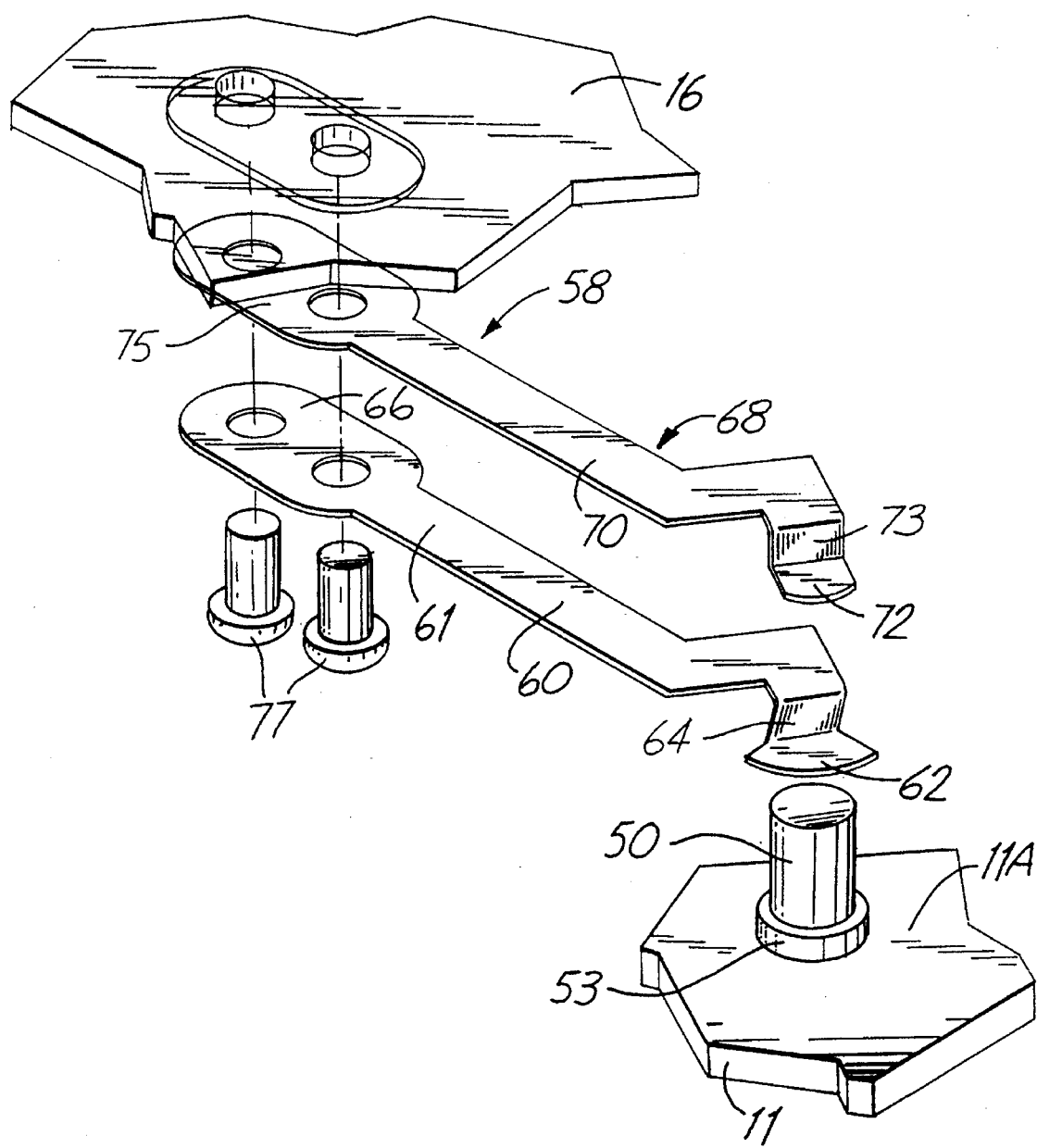
FIG. 4 is an exploded view of a compliant flange assembly made according to the present invention.

As shown in FIGS. 3 and 4, mounting end 66 of base strip 60 and the mounting end 75 of the spring length 70 of spring finger 68 are both attached to a boss 76 that is formed on the cover 16. The attachment of the compliant flange assembly 58 to the boss 76 is preferably by use of plastic pins 77 that are sonically welded in place on the boss 76 but the attachment can be made through suitable threaded screws or rivets, or by fusing the material of cover 16 to the mounting members, or by using other suitable fasteners so that the mounting ends 66 and 75 are secured to the cover 16.

The loading spring finger end 72 and the underlying compliant flange end 62 of the strip 60 are not fixed together but are separate pieces as illustrated in FIG. 4. As the compliant flange assembly 58 moves up and down as necessary for accommodating variations in the width or movement of the tape 15, there will be a slight sliding under a friction load between the loading spring finger end 72 and the underlying compliant flange end 62 of base strip 60. The frictional load between the loading spring finger end 72 that bears against the compliant flange end 62 of base strip 60 provides a dampening action to reduce the likelihood of unwanted vibrational modes that can occur as the high speed tape 15 slides along the tape guide. Both the base strip 60 and spring finger 68 of the compliant flange assembly 58 can be made from a wide variety of resilient materials, for example, polymers such as polycarbonate, or metal, but they preferably are made from a non-corrosive metal such as stainless steel.

The compliant flange assembly 58 has the ability to move up and down relative to the guide bearing surface cylinder 50, and because the tape bends around the post section, as shown in FIG. 1, the tape has compression resisting strength in its lateral or width direction, sufficient to withstand a light spring load. The tape 15 is urged under a light positive spring load against the upper surface 53A of the precisely machined and formed reference fixed support flange 53. There are no fixed upper flanges in the tape guides 26 and 28, so the only resistance to movement of the tape away from upper flange surface 53A of reference fixed support flange 53 is from the compliant flange assemblies 58 at tape guides 26 and 28. The construction and operation of tape guides 26 and 28 is identical.

The transducer 42 is positioned at a known location or height above the base plate surface 11A when the tape cartridge 10 is placed in a tape drive and thus the tape will always be precisely positioned as it passes across the transducer 42 so that the individual data tracks on the tape will be properly aligned with the proper portions of the transducer or read/write head 42.

Figure 5:
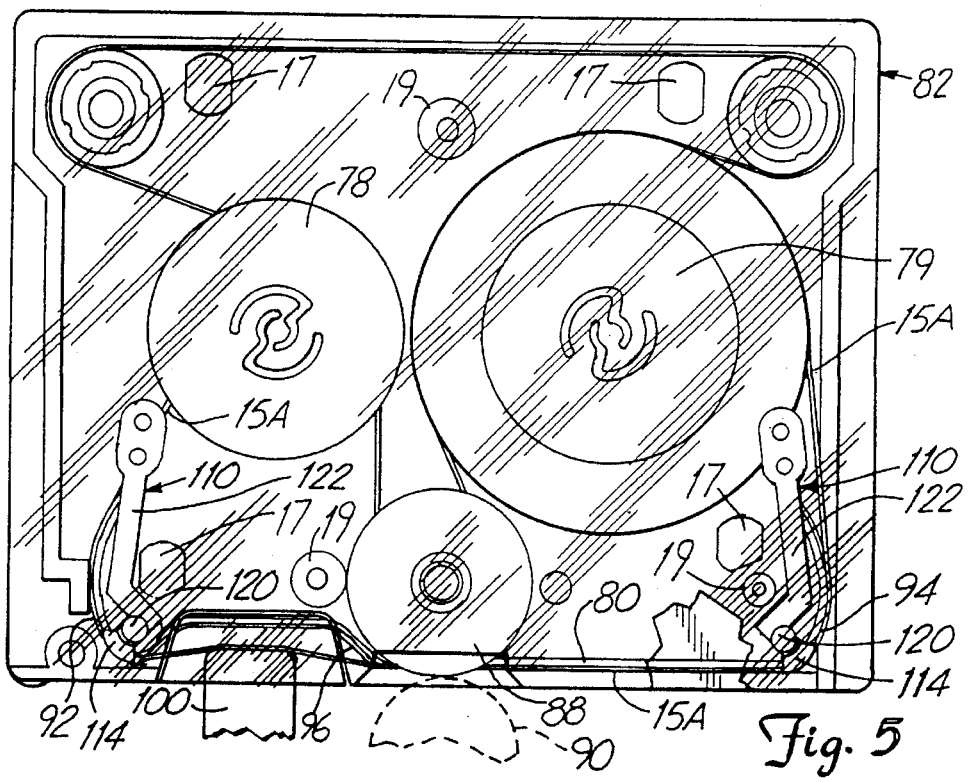
FIG. 5 is a plan view of a data cartridge having a magnetic tape guide made according to a second form of the present invention.
Figure 7:
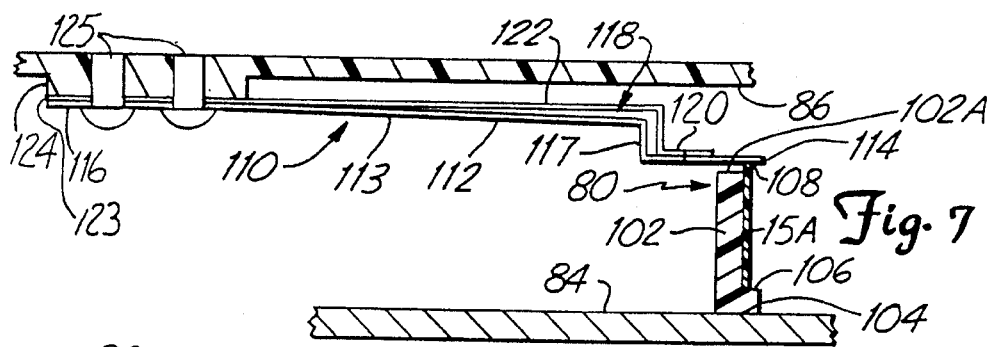
FIG. 7 is a sectional view taken along line 7—7 in FIG. 5.
Figure 6:
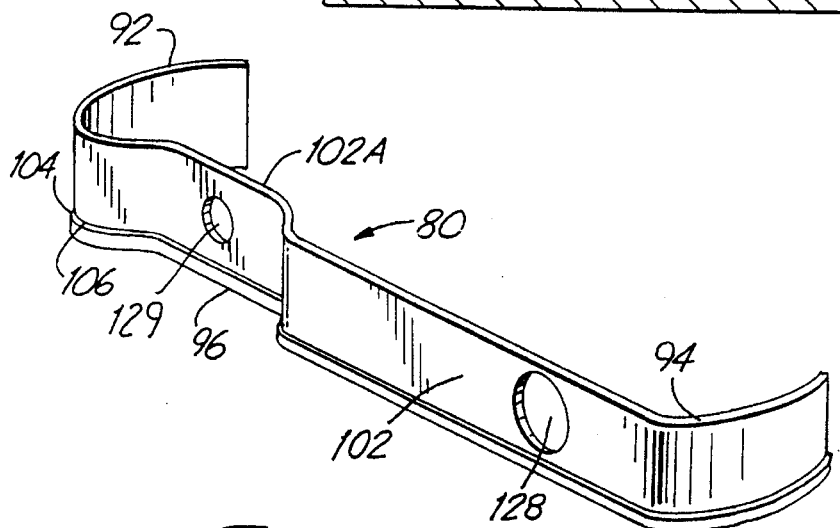
FIG. 6 is a perspective view of an extended tape guide shown line in FIG. 5.

In a second form of the invention, shown in FIGS. 5, 6, and 7 a tape 15A is in the form of a tape pack wound on tape reels or reel hubs 78 and 79 in a tape cartridge 82 that is essentially constructed as previously explained. A one piece elongated tape guide indicated generally at 80 is provided in tape cartridge 82. The elongated tape-guide 80 can be fabricated by assembling components, or extruded from a suitable material, such as aluminum, stainless steel or a suitable polymer, or the elongated tape guide 80 could be molded if desired. The tape 15A is moved between the tape reels and a drive belt in a conventional manner using a drive roller 88. The tape cartridge 82 includes a base plate 84 and a cover 86. The tape reels 78 and 79 are rotatably mounted on the base plate 84. The tape 15A is driven from drive roller 88, which in turn is driven by a drive puck or capstan 90, on a motor shaft on a tape drive assembly. In this form of the invention, the tape 15A is guided by the elongated tape guide 80 along a substantial portion of its path. The elongated tape guide 80 is formed to have curved guide end portions 92 and 94, and formed center portions 96 that are made so that they will clear the drive roller 88 and other components, and provide the desired tape path across a read/write head or transducer illustrated at 100.

The elongated tape guide 80 as shown in FIGS. 6 and 7 has an upright wall 102 that has a surface generally perpendicular to the base plate 84, and a formed flange 104 that rests on the base plate 84 and has a reference support shoulder surface 106 fixed at a proper location relative to the upper surface of the base plate 84 to position the lower edge of tape 15A at a desired height. The upright wall 102 has a height above the surface 106 that is less than the width of the tape 15A, as shown in FIG. 7. That means that an upper edge 108 of the tape 15A is above the upper edge 102A of the wall 102. A pair of compliant flange assemblies 110 are provided for loading the tape 15A toward the flange surface 106 with a desired light spring force. Each compliant flange assembly 110 in this form of the invention is made essentially as in the previous form of the invention but may be of different size, as needed. In this embodiment of the invention, each compliant flange assembly 110 includes a compliant flange base strip 112 that has a main spring section 113 and a flange end 114 that is offset from the main spring section 113 by a bend section 117. The flange end 114 bears against the upper edge 108 of tape 15A in the region of the curved guide end portions 92 and 94. A mounting end 116 is at the opposite end of the main spring section 113 from flange end 114. The base strip 112 is spring loaded with a spring finger 118 that has a main spring length 122 with an offset finger end 120 that bears against the flange end 114. The main spring length 122 has a mounting end 123, which together with the mounting end 116 is fastened with pins 125 to a boss 124 formed on the underside of the tape cartridge cover 86.

As in the previous form of the invention, and as shown in FIG. 5, the compliant flange assemblies 110 (two are shown) are positioned at the curved guide end portions 92 and 94 where the tape 15A is changing direction. The tape is guided into a cylindrical segment to give the tape stiffness to support lateral compression loads without buckling. The downward forces from compliant flange assembly 110 will hold the lower edge of the tape 15A against the flange surface 106 as the tape moves across the transducer 100.

As shown in FIG. 6, the tape guide wall 102 is provided with an aperture 128 for permitting transmission of optical signals that are used to sense the approach of the end of the tape 15A. The data carrying tapes used have light transmitting holes near the tape end. An optical sensor senses the light transmission through the tape holes and aperture 128 and provides a signal to indicate the approach of the tape end. The aperture 128 permits use of the existing tape end optical sensing arrangement with the elongated tape guide 80.

The smaller aperture 129 in the elongated tape guide 80, also shown in FIG. 6, is used as a locating hole for aiding in forming the curved end portions and other formed portions of the elongated tape guide 80 in the proper locations.

In each form of the invention the compliant flange assemblies will maintain the moving tape against the appropriate fixed flange surface so that the tape is properly positioned. The compliant flange assemblies provide a preload on the tape urging the tape to its desired reference position. If the tape width varies, or if there are any edge imperfections, or if the tape distorts, the respective compliant flange assembly will move or yield under spring loading as the tape moves past the tape engaging flange ends of the compliant flange assemblies. The compliant flange assemblies reduce the need for very tight tape width tolerances needed for making a suitable double flanged pin, or other construction that has two flanges, one at the top and one at the bottom. The top edge of the tape is constrained only by the compliant flange assemblies in both forms of the invention.

A reduction in tape wear is realized when compared to a fixed upper flange if the tape moves upwardly when using the present invention. The compliant flange assemblies will yield, while with a double flange post the tape will abrade against the fixed upper flange if the tape edge moves upwardly.

The tape guides and flange ends engaging the tape edge may be treated with material that has a low coefficient of friction to reduce wear, and may have a hardened outer surface layer, also to reduce friction loading and wear.

Vibrations that may occur as the high speed tape moves across the compliant flange assemblies of the present invention are dampened by the two part compliant flange assemblies, as previously explained. Also, if desired, a dampening material can be applied to the surfaces of the strips of the compliant flange assemblies, if needed.

Figure 8:
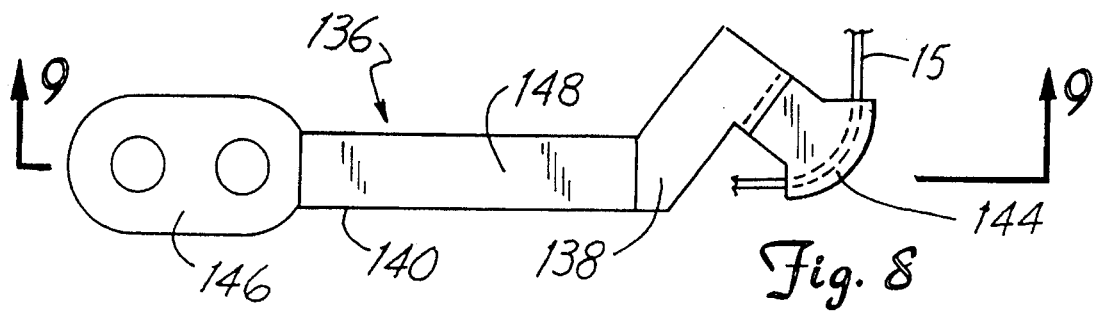
FIG. 8 is a top plan view of a modified compliant flange assembly usable with either of the previous two forms of the invention including a dampening material in the construction.
Figure 9:
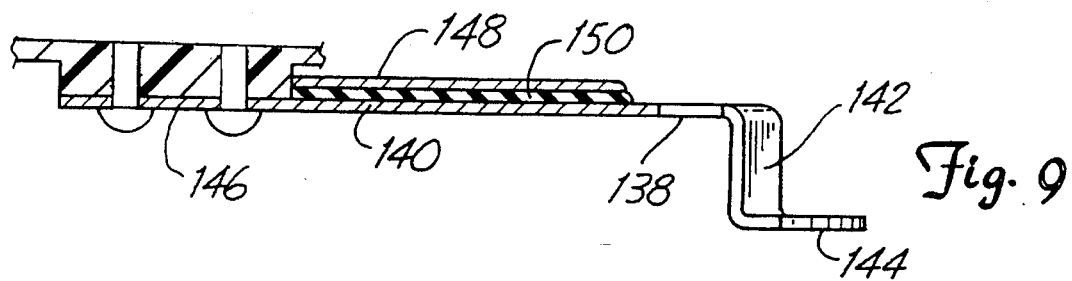
FIG. 9 is a side elevational view of the flange assembly of FIG. 8.

A modified form of the compliant flange assembly is shown in FIGS. 8 and 9 at 136 and is geometrically configured to replace the previously described compliant flange assemblies. In this form of the compliant flange assembly, there is a base strip 138 that has a main spring section 140, and a bend portion 142 supporting a compliant flange end 144 that engages the free or outer edge of a tape, as shown in the previous forms of the invention. A mounting end 146 is formed on the base strip 140, and is used for supporting the base strip in position against the cover, and in the manner previously explained.

In this form of the invention, the compliant flange assembly 136, as shown, includes a constraining layer of material 148 that is bonded to the main spring section 140 with a visco-elastic damping material layer 150 that holds the constraining layer in position on the main spring section 140 and provides dampening of vibrations that occur from a tape, such as tape 15 shown schematically in FIG. 8, rubbing against the compliant flange end 144. The dampening material is preferably a material made by 3M Company and disclosed in 3M brochure entitled 3M Product Information and Performance Data; SKOTCHDAMP brand Vibration Control Systems, Part No. 70-0703-7536-8 (73.4) R1.

The dampening material can be applied in any location along the base strip 138, but applying it as shown on the main spring section 140 provides for optimum dampening results with a reduced use of material and thus reduced weight.

The constraining layer 148 can be of any desired construction, but preferably is a stainless steel material in the range of 76 to 254 micro meters (0.003 to 0.010 inches) thick. The underlying base strip 138 can be approximately 76 to 254 micro meters (0.003 to 0.010 inches) thick. The visco-elastic layer may vary between approximately 51 to 254 micro meters (0.002 to 0.010 inches) thick.

Figure 10:
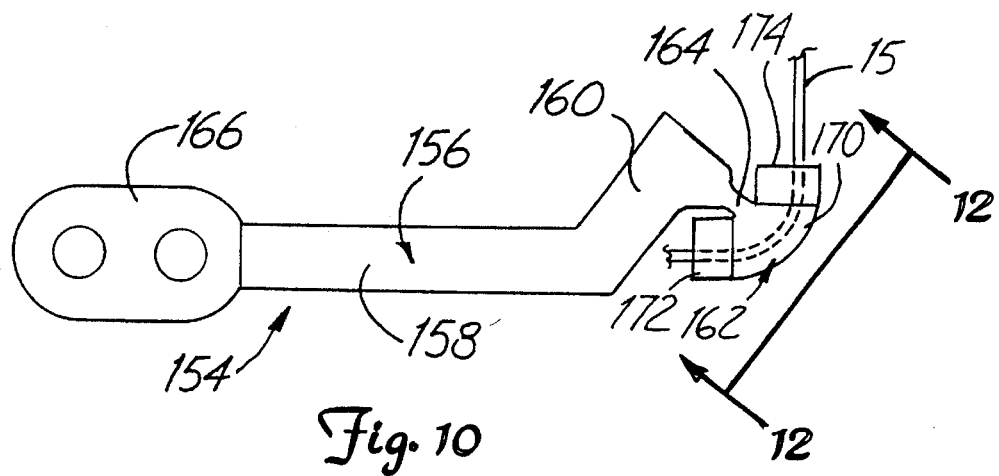
FIG. 10 is a top plan view of a further modified form of the compliant flange assembly.
Figure 11:
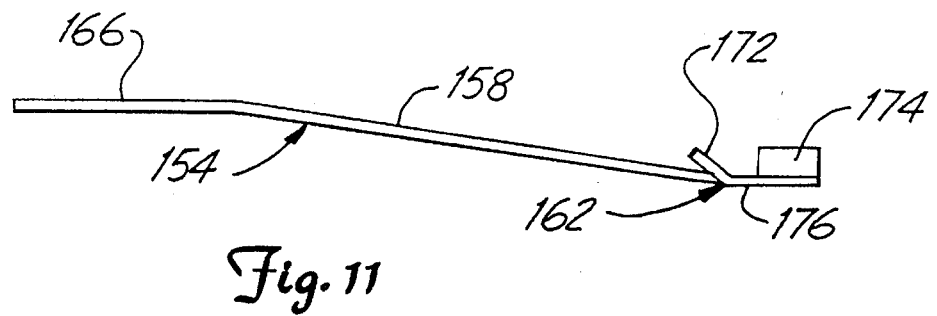
FIG. 11 is a side elevational view of the compliant flange assembly of FIG. 10.
Figure 12:
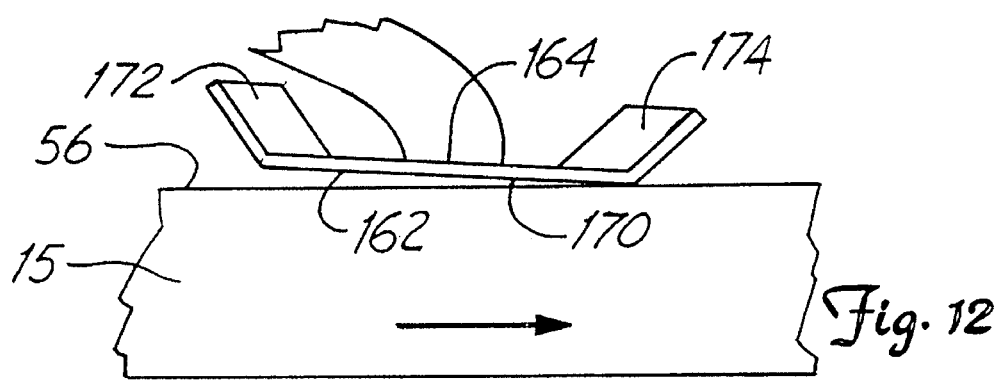
FIG. 12 is a fragmentary enlarged view taken as on line 12—12 in FIG. 10.

A further modified form of the compliant flange assembly is shown in FIGS. 10, 11, and 12 at 154 and comprises either a single base strip 156 as shown, or the base strip may have a constraining layer mounted thereon with dampening material between the constraining layers, as shown in FIGS. 8 and 9. An additional spring finger such as that shown in the first two forms of the invention also can be used with the base strip 156.

The base strip 156 has a main spring section 158, and a laterally offset section 160 which supports a flange end 162 through a relatively narrow neck or junction portion 164. A mounting end 166 on the base strip 156 is provided for mounting the base strip 156 to a cover of a data cartridge, as previously shown. The base strip 156 as shown inclines downwardly from the mounting end 166 to the flange end 162. The flange end 162 includes a tape engaging center section 170, that will engage an edge of a tape shown schematically at 15 which is guided so as to wrap into a part-cylindrical section, as previously explained. Additionally, however, small wings, including a lead-in wing 172 and an exit wing 174 are provided at the opposite edges of the tape engaging center section 170 of the flanged end 162. The exit end of the flanged end is the end of the tape engaging section that is closest to the transducer regardless of the direction of tape movement. The wings prevent the edges of the tape from snagging or dragging on edges of the flange end 162 as the tape moves toward the transducer. The junction portion 164 is slightly twisted (not perfectly planar) to lower the exit end and thus provide more load at the exit end of the flange end 162, as shown in an exaggerated condition in FIG. 12. With the twist in the narrow junction portion 164, there is a differential in loading on the edge of the tape 15 between the lead-in end and exit ends of center portion 170. The compliant flange end will be loaded resiliently by the spring section 158, and substantially the entire lower surface of the tape engaging center section 170 will rest on the tape edge in use.

FIG. 12 illustrates that if the center section 170 is moved toward the tape edge, the exit end adjacent the wing 172 will contact the edge 56 of the tape 15 prior to the time that the surface of center section 170 adjacent the exit wing 174 contacts the tape edge. There will be a slight differential in loading between the lead-in end and the exit end of the center section 170. The loading of the tape will be gradual from the lead-in end to the exit end of center section 170, and there will be less likelihood of any excessive tape wear caused by the lead-in end catching or abrading the tape edge. This arrangement is useful as the tape wound on the tape pack hubs is not perfectly aligned as it wraps onto the hubs and the greatest alignment force on the tape is applied closest to the transducer.

Figure 13:
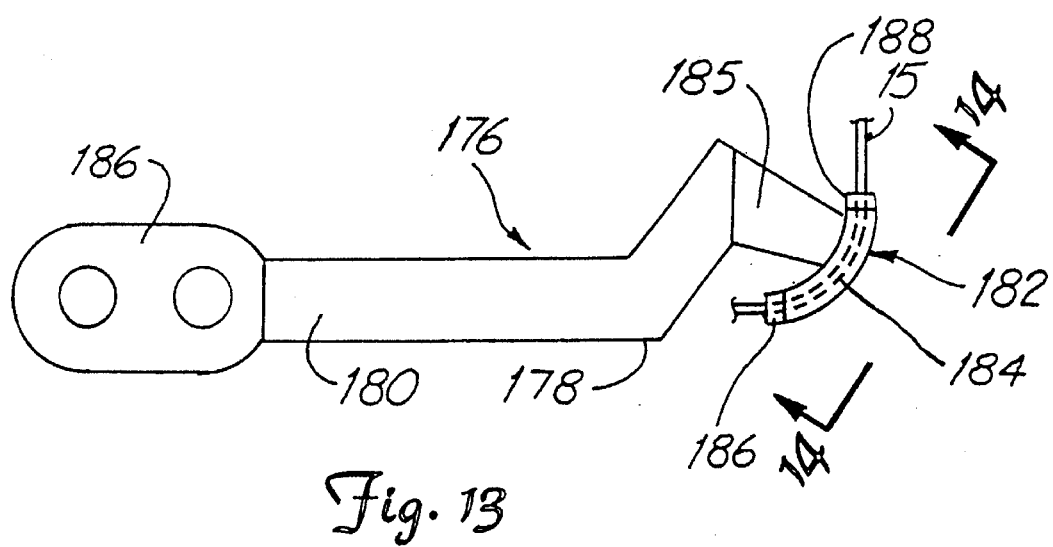
FIG. 13 is a still further modified form of a compliant flange assembly usable with the present invention.
Figure 14:
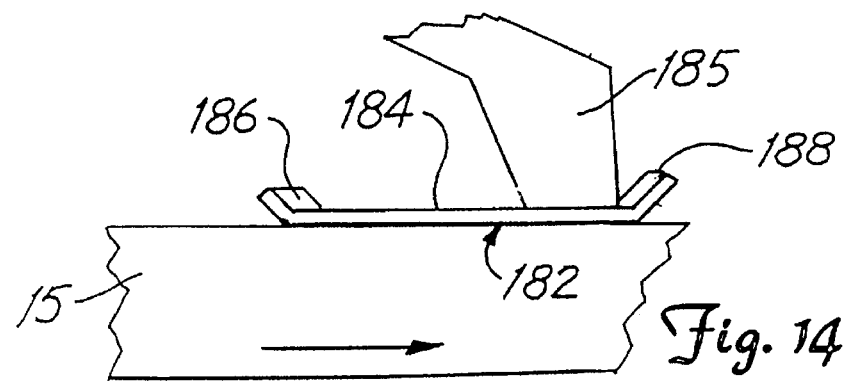
FIG. 14 is a fragmentary enlarged view taken as on line 14—14 in FIG. 13.

A further modified form of the invention is shown in FIGS. 13 and 14, and in this form, a plan view only of a compliant flange assembly 176 is illustrated. The compliant flange assembly 176 includes a base strip 178 that forms a main spring section 180, having a tape engaging flange end 182 that is joined to the main spring section through a junction portion 184. A base section 187 is provided on the base strip 178 for mounting the strip to the tape cartridge cover, as previously explained. A constraining strip can be mounted with a visco-elastic material to the main spring section 180, in this form of the invention if desired.

The flange end 182 has a main tape engaging section 184 that has a surface which engages the edge of a tape, and which has wing portions 186 and 188 at lead-in and exit ends, respectively.

The lead-in and exit ends of the main tape engaging section 184 are at different lateral distances from the center line of the junction portion. The main tape engaging section 184 is not mounted symmetrically with respect to the junction portion 185. Thus, a greater spring load will be applied at the exit end adjacent the wing 188 than at the lead-in end near wing 186, since the longer distance from the center line of junction portion 185 to wing 186 provides more flexibility of the main tape engaging section 184 than between the junction portion 185 and exit wing 188. The bend lines for the lead-in end and exit end wings on the tape engaging sections of the compliant flanges shown in FIGS. 10 through 14 are positioned orthogonal to the tape moving around the underlying guide surface.

The compliant flange assemblies 136, 156, and 176 can all be used in place of and mounted in the same manner as the compliant flange assemblies shown in FIGS. 1 through 7. Spring rates of the compliant flange assemblies may range between about 20 to 40 kilograms per meter. The flange preload force on the tape edge is between 2 to 20 grams.

Although the present invention has been described with reference to preferred embodiments, workers skilled in the art will recognize that changes may be made in form and detail without departing from the spirit and scope of the invention.

What is claimed is:

1. A belt driven magnetic tape cartridge having a base plate, a cover provided on the base plate wherein the cover has a top and a peripheral edge wall attached to the top and wherein the cover and base plate define a tape cartridge enclosure, a pair of tape reels supported in the enclosure above the base plate on spaced parallel axes, a length of magnetic tape wound on the tape reels, and a tape path extending between the reels and along one edge wall of the cartridge across a cutaway portion of the cartridge edge wall for access by a transducer, the path being defined in part by a tape guide including:

a surface portion that is slidably engaged by the tape as the tape is moved in its path, said surface portion positioning an engaged surface of the tape at a desired orientation;

a fixed flange adjacent said surface portion for supporting one edge of the tape in a desired location above the base plate; and a resilient spring flange having an end portion, wherein said spring flange is mounted to the top of the cover such that the end portion of said spring flange overlies an edge of the tape opposite from the edge supported on the fixed flange for resiliently maintaining the edge of the tape against the fixed flange as the tape moves along the tape path, and wherein the surface portion has a length in a direction along the width dimension of the tape which is less than the width dimension of the tape such that the spring flange continuously engages the opposite edge of the tape as the tape moves.

2. The belt driven magnetic tape cartridge of claim 1 wherein the tape guide comprises a wall portion having the surface portion, the wall portion comprising a portion of an upright cylindrical post positioned at a desired location for guiding the tape.

3. The belt driven magnetic tape cartridge of claim 2 wherein the surface portion supports the tape such that a longitudinal axis of the tape is perpendicular to the axes of the tape reels, and the tape forms a part cylindrical curve as it moves across the surface portion.

4. The belt driven magnetic tape cartridge of claim 1 wherein said spring flange includes a first spring flange section having a first end mounted to the cover and a flange end for engaging an edge of the tape, and a second spring finger section having a first end mounted to the cover and having a finger end beating against the flange end of the first spring flange section to bias the flange end against the tape.

5. The belt driven magnetic tape cartridge of claim 1, wherein said spring flange comprises a spring strip that resiliently bends, a constraining strip in substantial registry with said spring strip, and a visco-elastic material bonding the spring strip and constraining strip together.

6. The belt driven magnetic tape cartridge of claim 1, wherein said spring flange includes a first spring strip, and a flange end having a flange end surface for engaging an edge of the tape, and a junction portion mounting the flange end to the strip, said junction portion providing a spring load across a length of the flange end surface which is different between lead-in and exit ends thereof when the flange end surface is engaging the tape.

7. The belt driven magnetic tape cartridge of claim 6, wherein the junction portion is twisted to provide a greater spring load on an end of the flange end surface closest to the cutaway portion for access to a transducer when the flange end surface is engaging an edge of the tape.

8. The belt driven magnetic tape cartridge of claim 6, wherein said junction portion is connected to said flange end such that an exit end of the flange end is closer to the junction portion than an opposite end of the flange end.

9. The belt driven magnetic tape cartridge of claim 1, wherein the cartridge has a base plate supporting the tape reels and the guide member has the surface portion, the fixed flange having a flange surface for supporting the one edge of the tape at a known position relative to the base plate, the tape cartridge including a cover overlying the baseplate, the tape reels and the guide member, the resilient spring flange being supported on the cover.

10. The belt driven magnetic tape cartridge of claim 1 wherein the tape path is further defined in part by a second tape guide such that the tape path is defined by at least two tape guides that are engaged by the tape, wherein said second tape guide includes:

a surface portion that is slidably engaged by the tape as the tape is moved in its path, said surface portion positioning an engaged surface of the tape at a desired orientation;

a fixed flange adjacent said surface portion for supporting one edge of the tape in a desired location above the base plate; and a resilient spring flange having an end portion, wherein said spring flange is mounted to the top of the cover such that the end portion of said spring flange overlies an edge of the tape opposite from the edge supported on the fixed flange for resiliently maintaining the edge of the tape against the fixed flange as the tape moves along the tape path, and wherein the surface portion has a length in a direction along the width dimension of the tape which is less than the width dimension of the tape such that the spring flange continuously engages the opposite edge of the tape as the tape moves.

11. A belt driven magnetic tape cartridge having a base plate, a cover provided on the base plate wherein the cover has a top and a peripheral edge wall attached to the top and wherein the cover and base plate define a tape cartridge enclosure, a pair of tape reels supported in the enclosure above the base plate on spaced parallel axes, a length of magnetic tape wound on the tape reels, and a tape path extending between the reels and along one edge wall of the cartridge across a cutaway portion of the cartridge edge wall for access by a transducer, the path being defined in part by a tape guide, wherein the tape guide is in the form of an elongated guide member having a first end and a second end, wherein the elongated guide member includes:

a first curved surface portion at the first end of the elongated guide member, wherein said first curved surface portion is slidably engaged by the tape as the tape is moved in its path, said first curved surface portion positioning an engaged surface of the tape at a desired orientation;

a second curved surface portion at the second end of the elongated guide member, wherein said second curved surface portion is slidably engaged by the tape as the tape is moved in its path, said second curved surface portion positioning an engaged surface of the tape at a desired orientation;

a first fixed flange portion adjacent said first curved surface portion for supporting one edge of the tape in a desired location above the base plate;

a second fixed flange portion adjacent said second curved surface portion for supporting one edge of the tape in a desired location above the base plate;

a first resilient spring flange having an end portion, wherein said first spring flange is mounted to the top of the cover such that the end portion of said first spring flange overlies an edge of the tape opposite from the edge supported on the first fixed flange portion for resiliently maintaining the edge of the tape against the first fixed flange portion as the tape moves along the tape path; and a second resilient spring flange having an end portion, wherein said second spring flange is mounted to the top of the cover such that the end portion of said second spring flange overlies an edge of the tape opposite from the edge supported on the second fixed flange portion for resiliently maintaining the edge of the tape against the second fixed flange portion as the tape moves along the tape path; and wherein each of the first and second curved surface portions has a length in a direction along the width dimension of the tape which is less than the width dimension of the tape such that each of the first and second spring flanges continuously engages the opposite edge of the tape as the tape moves.

12. A belt driven magnetic tape cartridge having a base plate, a cover provided on the base plate wherein the cover has a top and a peripheral edge wall attached to the top and wherein the cover and base plate define a tape cartridge enclosure, a pair of tape reels supported in the enclosure above the base plate on spaced parallel axes, a length of magnetic tape wound on the tape reels, and a tape path extending between the reels and along one edge wall of the cartridge across a cutaway portion of the cartridge edge wall for access by a transducer, the path being defined in part by a tape guide including:

a surface portion that is slidably engaged by the tape as the tape is moved in its path, said surface portion positioning an engaged surface of the tape at a desired orientation;

a fixed flange adjacent said surface portion for supporting one edge of the tape in a desired location above the base plate; and a resilient spring flange having an end portion, wherein said spring flange is mounted to the top of the cover such that the end portion of said spring flange overlies an edge of the tape opposite from the edge supported on the fixed flange for resiliently maintaining the edge of the tape against the fixed flange as the tape moves along the tape path, and wherein said spring flange includes a first spring flange section having a first end mounted to the cover and a flange end for engaging an edge of the tape, and a second spring finger section having a first end mounted to the cover and having a finger end bearing against the flange end of the first spring flange section to bias the flange end against the tape.

* * * * *

UNITED STATES PATENT AND TRADEMARK OFFICE
CERTIFICATE OF CORRECTION

PATENT NO.: 5,490,029

DATED: February 6, 1996

INVENTOR(S): Madsen et al.

It is certified that error appears in the above-identified patent and that said Letters Patent is hereby corrected as shown below:

Col. 10, line 56, "beating" should be --bearing--.

Signed and Sealed this

Thirteenth Day of August, 1996

Attest:

BRUCE LEHMAN

Attesting Officer        Commissioner of Patents and Trademarks